United States Patent [19]

Slagel

[11] 4,353,386

[45] Oct. 12, 1982

[54] SEQUENCING VALVE

[76] Inventor: Roger D. Slagel, 641 NW. 74th Ave., Plantation, Fla. 33317

[21] Appl. No.: 293,362

[22] Filed: Aug. 17, 1981

[51] Int. Cl.³ ............................................. G05D 11/03
[52] U.S. Cl. ............................... 137/119; 137/624.18; 137/625.11; 137/853
[58] Field of Search .............. 137/119, 624.18, 625.11, 137/853

[56] References Cited

U.S. PATENT DOCUMENTS

| 2,930,399 | 3/1960 | Babson et al. | 137/853 |
| 3,632,043 | 1/1972 | Kirschmann et al. | 137/853 |
| 3,924,652 | 12/1975 | Kah, Jr. | 137/624.18 |
| 4,034,775 | 7/1977 | Slagel | 137/119 |
| 4,109,670 | 8/1978 | Slagel | 137/119 |
| 4,149,556 | 4/1979 | Schwabe | 137/853 |

Primary Examiner—H. Jay Spiegel
Attorney, Agent, or Firm—Malin & Haley

[57] ABSTRACT

An improved flow sequencing and check valve which delivers a single source of fluid to a plurality of outlets. The improvement includes a generally cup-shaped portion which never disengages with the entrance port as it moves the sequencing disc closed in response to a broad range of fluid flow and pressure conditions. The cup-shaped portion is in continuous engagement with the entrance port, allowing virtually all of the fluid to pass through exit ports in the base of the cup-shaped portion and through outlet apertures controlled by deflectable flappers integral to the sequencing disc. Hence, both fluid weight and pressure continuously act upon the cup portion to seat the sequencing disc.

3 Claims, 5 Drawing Figures

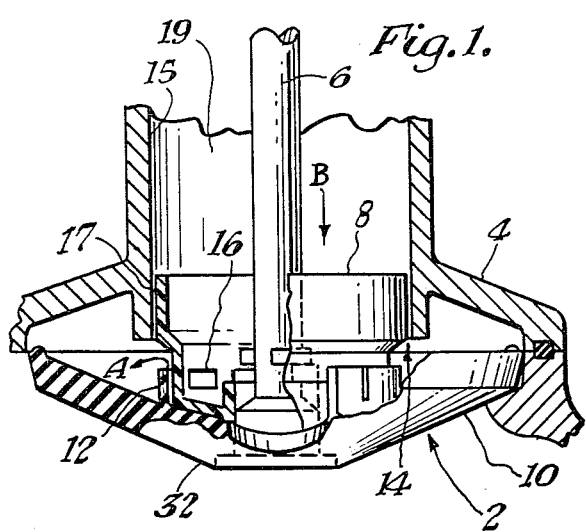
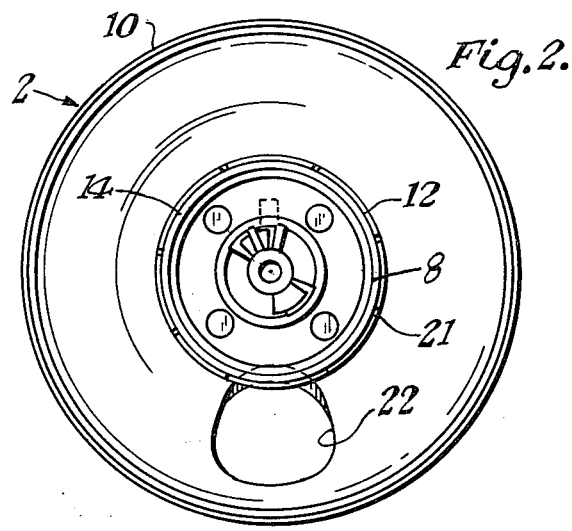
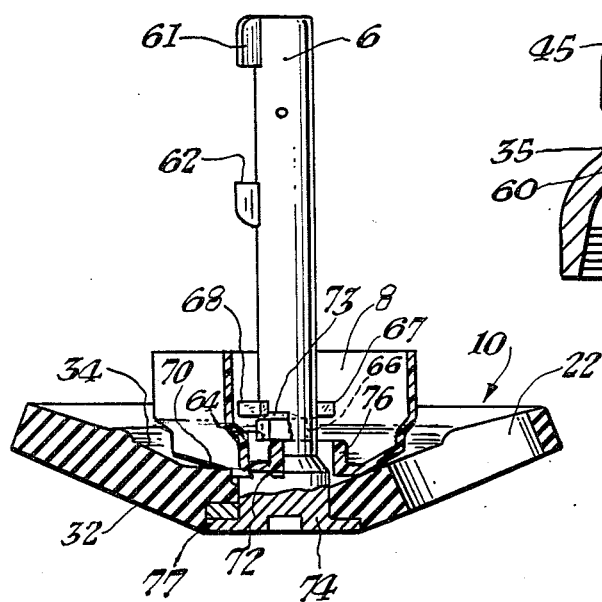
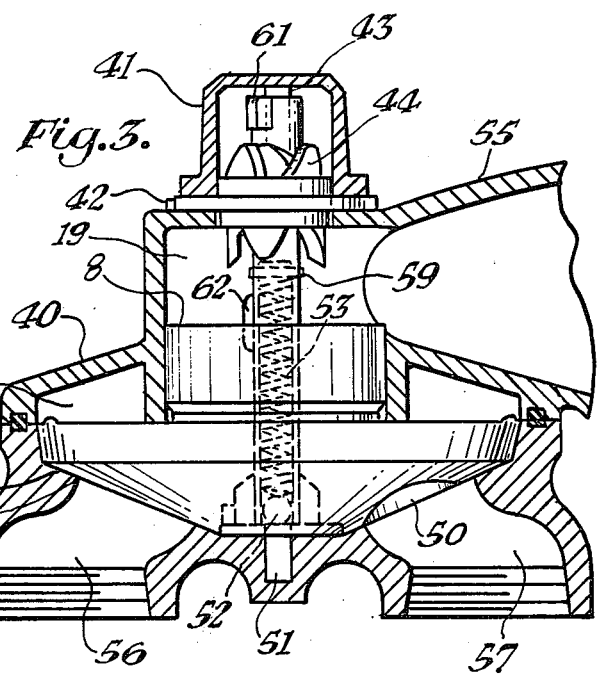
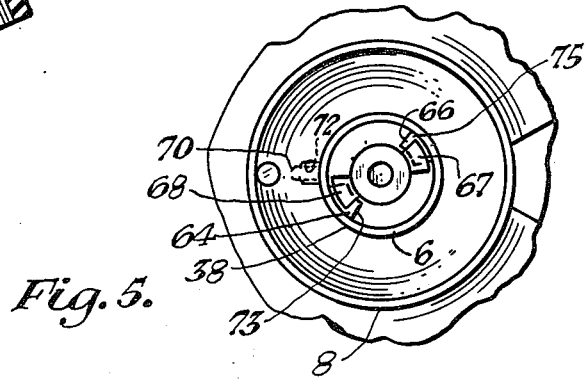

SEQUENCING VALVE

BACKGROUND OF THE INVENTION

The present invention relates to a combination check flow control and sequencing valve having a reciprocating and rotating sequencing sealing means and check flow control valve means to distribute fluid from an inlet sequentially out through a plurality of outlets, and particularly to an improved combination check flow control and sequencing disc means which will respond to very low fluid flow rates and even to near-zero-pressure conditions.

Previous sequencing valves have failed to respond to very low flow rates and could falsely cycle when fluid pressure surged at low flow conditions. Further, fluid flow would begin before the valve was fully seated causing some fluid to pass out of other than the port selected. The sequencing valve in Slagel, U.S. Pat. No. 4,034,775, realizing an increased ability to respond and sequence properly at low fluid flow rates by incorporating a cup-shaped check valve incurs similar problems at very low fluid flow rates and inlet pressure fluctuations.

SUMMARY OF THE INVENTION

The present invention is an improvement in the sequencing disc assembly for a sequencing valve. The sequencing disc assembly includes a stem, a resilient main sealing means or sequencing disc, and a generally cup-shaped check valve means. The improved sequencing disc assembly incorporates a longer cup-shaped check valve and flapper valves integral to the main sealing means, circumferentially located about the cup-shaped check valve. The longer check valve remains engaged to the check valve bore throughout the entire sequencing cycle allowing both inlet water pressure and the weight of collected water to seat the main sealing means by forcing it downward against spring biasing pressure. Virtually all fluid entering the sequencing valve passes through the center of the cup-shaped check valve exiting at ports near the base of the cup. The resilient flapper valves are then cantilevered outwardly to an open position as fluid flow is increased therebetween. When inlet fluid flow stops, the resilient flapper valves return to a closed position which still provides enough clearance to the base of the check valve to allow fluid to drain from the internal chamber of the sequencing valve, yet sufficiently small clearance to provide the reverse flow check flow function. Flow holes at the base of the check valve means are sufficiently small to provide a filtering means for large objects in the incoming fluid flow, aiding in proper action of the sequencing valve. Clearance between check valve and the check valve bore is sufficient to allow free movement of the check valve even in the presence of debris or deposits in the fluid.

As is well-known in the art, the stem provides positive engagement means between the sequencing disc and the check valve. The stem also engages a replaceable cam located in the top of the valve housing to stabilize the stem and to regulate the rotational movement of the sequencing disc in relation to a plurality of outlet ports. A biasing spring is internally located in the stem engaging a fixed axle in the base member of the valve housing to urge the sequencing disc means upward during no-flow conditions.

It is an object of this invention to provide an improved sequencing disc means which will operate properly from very low to high fluid flow rates.

It is another object of this invention is to provide an improved combination check-flow control and sequencing valve which will not falsely operate in response to inlet pressure fluctuations.

It is still another object of this invention to improve the interconnection between the stem, check valve means and sequencing disc to provide a more stable relation between the three.

It is yet another object of this invention to provide a sequencing disc means operated by both fluid flow and inlet pressure, both controlled by variable clearance between resilient flapper valves integral to the sequencing disc and exit ports in the check valve means.

In accordance with these and other objects which will be apparent hereinafter, the instant invention will now be described with particular reference to the accompanying drawings.

DESCRIPTION OF THE DRAWINGS

FIG. 1 is a partial side view of the new and improved sequencing disc assembly illustrated in an upper position while flow is terminated.

FIG. 2 is a top view of the new and improved sequencing disc assembly.

FIG. 3 is a cross-sectional view of the new and improved sequencing disc assembly.

FIG. 4 is a partial cross-sectional view of the new and improved sequencing disc assembly.

FIG. 5 is a partial top view of the sequencing disc assembly of FIG. 4 with the generally cup-shaped member in a locked position.

DESCRIPTION OF THE PREFERRED EMBODIMENT

Referring now to the drawings of the invention, and in particular, to FIG. 1, the sequencing disc assembly 2 is illustrated within the sequencing valve upper housing 4 and includes a cup-shaped check valve 8, a stem 6, and a resilient main sealing means 10, also referred to as a sequencing disc. The cup-shaped check valve 8 responds by movement downwardly to both fluid weight collected and fluid inlet pressure continuously as the sequencing disc assembly 2 moves throughout its sequencing cycle. Stem 6 interconnects sequencing disc 10 to the check valve 8, forming the integral sequencing disc assembly 2. The resilient flapper valves 12, integral to sequencing disc 10, respond to fluid flow in direction A, which enters the center portion of the check valve 8 in the general direction of arrow B, by deflecting outwardly, increasing gap 14 in proportion to fluid flow out through ports 16. Flapper valve movement is enhanced by a plurality of radial slits 21 shown in FIG. 2. When inlet flow stops, the flapper valves 12 return to a closed position as shown in FIG. 1, reducing gap 14 to a minimum clearance to the base of the check valve 8 which allows fluid to drain from the internal chamber 45 yet is sufficiently restrictive of the next cycle of inlet fluid flow to provide proper valve sequencing at very low inlet flow.

The exterior surface 17 of check valve 8 moves up and down in continuous contact with inner surface 15 of the check valve bore 19. The check valve 8 has a plurality of exit ports 16 for draining the check valve of fluid when inlet flow stops. The size of the circular fluid exit gap 14 controls the minimum fluid flow rate for operating the sequencing disc assembly.

The positioning of the cup-shaped check valve assembly 8 provides a filtering effect for foreign substances in the incoming fluid to prevent the foreign substances from moving between the lower sealing surface 32 of the sequencing disc and the upper sealing surface 35 of the valve housing causing improper sealing.

The sequencing valve housing 4, a portion of which is shown in FIGS. 1 and 3, encompasses the sequencing disc assembly 2. The sequencing valve housing 4 includes an upper housing body 40 and a lower housing body 50 forming integral chamber 45. The upper housing body 40 includes a side fluid inlet 55, a cam cover 41, and cam 44. The lower housing body 50 includes a fixed axle 51 to receive and locate the stem 6 and to apply upward biasing pressure on the sequencing disc 10 transmitted through integral ball bearing 52, spring 53 and against pin 59. The lower housing also includes a plurality of fluid exit ports 56 and 57, and raised beads 58 and 60 around the perimeter of exit ports 56 and 57 which seat against the main sealing means 10.

The sequencing disc assembly 2 reciprocates and rotates in the internal chamber 45 by any well known method such as disclosed in prior art in my U.S. Pat. No. 4,034,775 incorporated by reference herein and made a part hereof. A complete cycle begins as in FIG. 1 just prior to fluid flow into the check valve bore 19. Sufficient fluid inlet pressure and/or flow within and against check valve 8 moves the sequencing disc assembly 2 into the position in FIG. 3. After fluid inlet flow ceases and drainage has occurred, spring 53 urges the sequencing disc assembly 2 up to the position in FIG. 1 ready for another cycle. During each cycle, opening 22 rotates sequentially to the next outlet and, in the lower position, cooperates with outlet ports 56 and 57 to distribute fluid.

As is well known in prior art in my U.S. Pat. No. 4,109,670 incorporated by reference and made a part hereof, the upper portion of stem 6 is stabilized and rotates about upper axle 43, integral to cam cover 41. Also known in prior art, stem 6 also includes two offset cam followers 61 and 62 that follow cam faces on cam 44, fixed in upper housing body 40, controlling the stem movement to move opening 22 in sequencing disc 10 between each outlet port in sequence. The cam followers provide positive movement of the stem during its vertical rotational movement prohibiting skipping of a position. Cam cover 41 is held in place by hold-down bolts, which also secure cam 44 at its integral flange 42. Other features are well-known in prior art.

The stem also includes prior art cam members 67 and 68 having sloping surfaces in FIGS. 5 and 6. The check valve means 8 includes mating cam means 64 and 66 having mating sloping surfaces. When the check valve means 8 is placed over stem 6 and cams 64 and 66 are moved downwardly past cam members 67 and 68 the cam members 64 and 66 may be brought into engagement under cam members 67 and 68. When the mating cam members are moved into a locking position, that is, into engagement, the camming action drives the lower end 76 of the check valve means into positive engagement with the upper surface 34 of the sequencing disc 10. There is a locking notch 72 in the lower surface of check valve means 8 that mates with a bulbous portion 70 on the upper surface 34 of sequencing disc 10. Stops 73 and 75 on the cam members 66 and 68 of check valve means 8 prevent excess engagement rotation. Stem 6 includes a locking key 77 which engages a mating pocket in the lower surface 32 of sequencing disc 10 to prevent relative rotation. When the check valve means 8 is in its final position as shown in FIG. 6, the stem 6 and sequencing disc 10 are releasably locked together and placed in a rigid or fixed position relative to one another.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fluid sequencing valve including a sequencing disc assembly with a sequencing disc means, a stem, and biasing means, operably connected in a fluid sequencing valve whose housing includes a check valve bore, a fluid inlet and at least two fluid outlets, said sequencing valve also including a means for rotatably positioning said sequencing disc assembly by movably cooperating with said stem connected to said sequencing disc assembly, and said biasing means which lifts said sequencing disc means away from said fluid outlet when fluid flow stops, said sequencing disc means comprising:

a generally cup-shaped check valve means operably connected in said housing for movement relative to inlet fluid flow and inlet fluid pressure and having cup-shaped body with a generally cylindrical wall;

said cup-shaped valve means being continuously engaged within the check valve bore adjacent said fluid inlet in said housing during all positions of said sequencing disc;

a means for allowing fluid to drain from said cup-shaped valve at a predetermined flow rate; and said sequencing disc connected to said cup-shaped check valve means;

said sequencing disc including an aperture disposed therethrough operably positioned on said disc for allowing outflow of fluid through at least one of said fluid outlets in said housing, said sequencing disc reciprocating into engagement with said fluid outlets each time fluid pressure above a predetermined minimum pressure is applied to said inlet, said means for rotatably positioning operating to rotatably position said aperture into alignment with the next successive outlet with at least one successive reciprocation, fluid being conveyed first from said inlet into said check valve bore, then into and through said check valve means and finally through said drainage means before passing through said disc aperture said check valve means including:

at least one fluid exit port operably positioned in said cylinder wall to allow fluid to drain from said cup-shaped valve;

at least one resilient one way valve means connected to said exit port on the outside of said cylinder wall and overlying said exit port;

said one way valve means allowing fluid to drain from said cup-shaped body at a predetermined fluid flow rate lower than the minimum operational fluid flow rate of said sequencing valve to allow said housing to empty of fluid when flow ceases;

said one way valve means positioned relative to said exit port such that said sequencing disc seats against each said fluid outlet for all fluid flow rates;

said one way valve means positioned relative to said exit port such that reverse fluid flow into said fluid outlets is substantially restricted.

2. A sequencing valve as defined in claim 1 wherein said cup-shaped check valve is circular and operating clearance between said check valve and said check valve bore is sufficient to prevent deposits in the fluid from interferring with the free operation of said sequencing disc assembly.

3. A sequencing valve as defined in claim 1 wherein said check valve means further includes:

a plurality of fluid exit ports operably positioned in said cylinder wall to allow fluid to drain from said cup shaped valve;

said one way valve means including:

a plurality of flexible flapper valves integral to the upper surface of said sequencing disc;

said flapper valves generally parallel to said cylinder wall;

said flapper valves circumferentially positioned to flexibly cooperate with said exit ports in said cylindrical wall.

* * * * *